United States Patent
Takiguchi

(10) Patent No.: US 8,534,125 B2
(45) Date of Patent: Sep. 17, 2013

(54) FLOW MEASURING DEVICE HAVING AN ADJUSTING TERMINAL IN THE CONNECTOR THAT IS COPLANAR WITH THE PROJECTION PORTION

(75) Inventor: Tomoyuki Takiguchi, Okazaki (JP)

(73) Assignee: Denso Corporation, Kariya (JP)

( * ) Notice: Subject to any disclaimer, the term of this patent is extended or adjusted under 35 U.S.C. 154(b) by 280 days.

(21) Appl. No.: 13/196,145

(22) Filed: Aug. 2, 2011

(65) Prior Publication Data
US 2012/0048032 A1 Mar. 1, 2012

(30) Foreign Application Priority Data
Aug. 24, 2010 (JP) ................................. 2010-187113

(51) Int. Cl.
*G01F 1/68* (2006.01)
(52) U.S. Cl.
USPC ................................... 73/204.11; 73/204.22
(58) Field of Classification Search
None
See application file for complete search history.

(56) References Cited

U.S. PATENT DOCUMENTS

| | | | | |
|---|---|---|---|---|
| 5,672,822 | A * | 9/1997 | Sawada et al. | 73/202.5 |
| 5,894,088 | A * | 4/1999 | Sawada et al. | 73/204.19 |
| 6,070,462 | A | 6/2000 | Igarashi et al. | |
| 6,510,735 | B2 | 1/2003 | Igarashi et al. | |
| 6,598,472 | B2 | 7/2003 | Igarashi et al. | |
| 6,725,715 | B2 | 4/2004 | Igarashi et al. | |
| 6,865,938 | B2 * | 3/2005 | Pesahl et al. | 73/204.22 |
| 7,281,423 | B2 | 10/2007 | Igarashi et al. | |
| 8,037,751 | B2 * | 10/2011 | Ariyoshi et al. | 73/204.27 |
| 2003/0182999 | A1 | 10/2003 | Kouno | |
| 2004/0060361 | A1 | 4/2004 | Kozawa et al. | |
| 2004/0177684 | A1 * | 9/2004 | Igarashi et al. | 73/204.11 |
| 2011/0283773 | A1 * | 11/2011 | Suzuki | 73/25.05 |

FOREIGN PATENT DOCUMENTS

| | | |
|---|---|---|
| JP | A-H05-312613 | 11/1993 |
| JP | U-H05-090464 | 12/1993 |
| JP | B-3323745 | 9/2002 |

OTHER PUBLICATIONS

Japanese Office Action dated Jun. 5, 2012, issued in corresponding Japanese Application No. 2010-187113 with English Translation.

* cited by examiner

*Primary Examiner* — Harshad R Patel
(74) *Attorney, Agent, or Firm* — Nixon & Vanderhye PC

(57) ABSTRACT

A flow measuring device includes a flow rate sensor, an electronic circuit, a connector, and an adjusting terminal. The sensor outputs a detection signal in accordance with a flow rate. The circuit is electrically connected to the sensor to control input into and output from the sensor. The connector includes a connecting terminal and a connector housing. The connecting terminal electrically connects together the circuit and an external device. The housing is formed in a cylindrical shape having a bottom and an opening to hold the connecting terminal. The housing includes a projection portion that projects from a bottom face of the bottom toward the opening. The adjusting terminal is electrically connected to the circuit to adjust the circuit. The adjusting terminal is held by the housing and includes an exposed part exposed from the housing. The exposed part is exposed from a surface of the projection portion on an opening-side.

1 Claim, 4 Drawing Sheets

FLOW MEASURING DEVICE HAVING AN ADJUSTING TERMINAL IN THE CONNECTOR THAT IS COPLANAR WITH THE PROJECTION PORTION

CROSS REFERENCE TO RELATED APPLICATION

This application is based on and incorporates herein by reference Japanese Patent Application No. 2010-187113 filed on Aug. 24, 2010.

BACKGROUND OF THE INVENTION

1. Field of the Invention

The present invention relates to a flow measuring device that includes a adjusting terminal for adjusting an electronic circuit that controls input/output of a flow rate sensor.

2. Description of Related Art

A flow measuring device is for measuring the amount of suction air in an engine for an automobile, for example. The flow measuring device includes a flow rate sensor that is disposed in a flow passage to serve as a detecting part for detecting a flow rate, an electronic circuit that controls input/output of the flow rate sensor, and a connector that connects the electronic circuit to an external device. A terminal that electrically connects the electronic circuit and the external device, and an adjusting terminal for adjusting the electronic circuit are connected to the electronic circuit. The terminal and the adjusting terminal are held by a cylindrical connector housing having a bottom.

In a flow measuring device 100 (see FIG. 4A) disclosed in Japanese Patent No. 3323745, for example, a detecting part 101 (detecting element) that is disposed in a flow passage, and an electronic circuit 102 that is electrically connected to the detecting element and a connector 103 are provided. In the connector 103, one end of a terminal 105 projects from a bottom face 107 of a connector housing 106 toward an opening 108. A hole 110 that is recessed from the bottom face 107 further in the opposite direction from the opening is formed on the bottom face 107 of the connector housing 106. A adjusting terminal 111 is provided in the hole 110 to be exposed to the inside of the hole 110.

However, in this flow measuring device 100, since the adjusting terminal 111 is provided in the hole 110 on the bottom face 107 of the connector housing 106, if a water content enters into the connector housing 106 at the time of fitting a counterpart connector into the connector 103, water accumulates in the hole 110, and the water enters toward the electronic circuit from an interface 112 between the connector housing 106 and the adjusting terminal 111, so that an electrical defect may be caused. This phenomenon may be produced markedly particularly when the flow measuring device 100 is disposed such that the opening 108 of the connector housing 106 faces in the upper direction and the bottom face 107 faces in the lower direction.

A technology for adjusting an electronic circuit 201 is described (see FIG. 4B) in Japanese Patent No. 4170095. In a flow measuring device 200 described in Japanese Patent No. 4170095, a housing 202 that accommodates the electronic circuit 201, and a connector housing 203 are integrally formed; a part of a terminal 204 connected to the electronic circuit 201 is exposed to the outside of the housing 202; and a device 206 for adjustment is connected to this exposed portion (exposed part 205), so as to adjust the electronic circuit 201. However, this technology creates a need to seal the exposed part 205 after adjustment because the exposed part 205 used for adjustment is located to be in contact with outside air.

On the other hand, in the case of providing the adjusting terminal 111 in the connector housing 106 as in Japanese Patent No. 3323745, the adjusting terminal 111 is not in contact with outside air because of the fitting to the counterpart connector. Therefore, the adjusting terminal 111 does not need to be sealed after adjustment. Nevertheless, as described above, in the flow measuring device 100 in Japanese Patent No. 3323745, there is a problem that water easily enters toward the electronic circuit from the interface 112 of the connector housing 106 and the adjusting terminal 111.

SUMMARY OF THE INVENTION

The present invention addresses at least one of the above disadvantages.

According to the present invention, there is provided a flow measuring device including a flow rate sensor, an electronic circuit, a connector, and an adjusting terminal. The flow rate sensor is configured to output a detection signal in accordance with a flow rate. The electronic circuit is electrically connected to the flow rate sensor to control input into and output from the flow rate sensor. The connector includes a connecting terminal and a connector housing. The connecting terminal electrically connects together the electronic circuit and an external device. The connector housing is formed in a cylindrical shape having a bottom and an opening to hold the connecting terminal. The connector housing includes a projection portion that projects from a bottom face of the bottom toward the opening. The adjusting terminal is electrically connected to the electronic circuit so as to adjust the electronic circuit. The adjusting terminal is held by the connector housing and includes an exposed part exposed from the connector housing. The exposed part is exposed from a surface of the projection portion on an opening-side.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
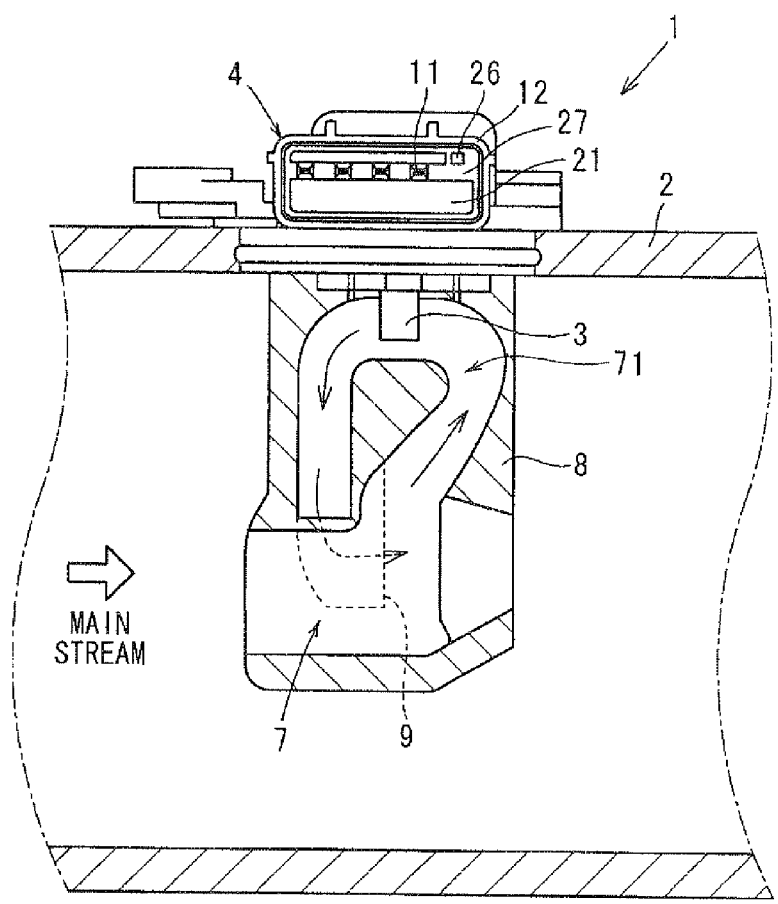
FIG. 1 is a sectional view illustrating a flow measuring device in accordance with an embodiment of the invention.

A connector housing of a flow measuring device of the invention includes a projection portion that projects from a bottom face of the connector housing toward an opening. An adjusting terminal is held by the connector housing, and includes an exposed part exposed from the connector housing, and the exposed part is exposed from a surface of the projection portion on the opening side.

Configuration of a flow measuring device 1 in accordance with an embodiment of the invention will be described in reference to FIGS. 1 to 3. The flow measuring device 1 is an air flow meter that measures the amount of suction air in an engine for an automobile, for example, and the device 1 is attached to a duct 2 connected to a downstream side of an air cleaner. The flow measuring device 1 includes a flow rate sensor 3 that outputs a detection signal in accordance with a flow rate, a circuit chip (not shown) having an electronic circuit that is electrically connected to the flow rate sensor 3 to control input/output of the flow rate sensor 3, and a connector 4 that connects the electronic circuit to an external device (see FIG. 1).

The flow rate sensor 3 is of a thin film type having/having a heater element (not shown) and a thermo sensor (not shown) formed from a thin film resistor on a surface of a semiconductor substrate. The flow measuring device 1 includes a resin housing 8 that defines a bypass flow passage 7, which takes in a part of air (mainstream) flowing in the duct 2, and the flow rate sensor 3 is disposed in the bypass flow passage 7 to output the detection signal in accordance with a flow rate through the bypass flow passage 7. In the present embodiment, the bypass flow passage 7 includes a sub-bypass flow passage 71 branching further from the bypass flow passage 7, and the flow rate sensor 3 is disposed in the sub-bypass flow passage 71. An outlet 9 of the sub-bypass flow passage 71 opens in a downstream direction of the mainstream on a side surface of the housing 8 that is in a direction of a plane of paper.

The circuit chip is connected to the flow rate sensor 3 to enable input/output thereto. Electronic circuits, such as a control circuit for controlling an electric current flowing through the heater element of the flow rate sensor 3, and an output circuit for outputting the detection signal, which is outputted from the flow rate sensor 3, after calculation and amplification, are integrated into the circuit chip. The flow measuring device 1 of the present embodiment includes also a thermistor (not shown) that measures temperature of air in the duct 2.

Figure 2A:
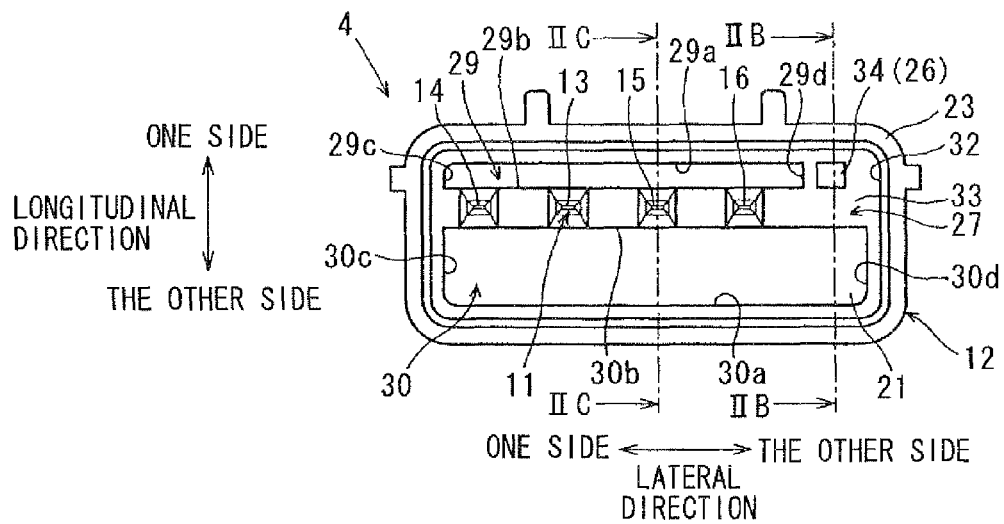
FIG. 2A is a front view illustrating a connector of the flow measuring device in accordance with the embodiment.
Figure 3:
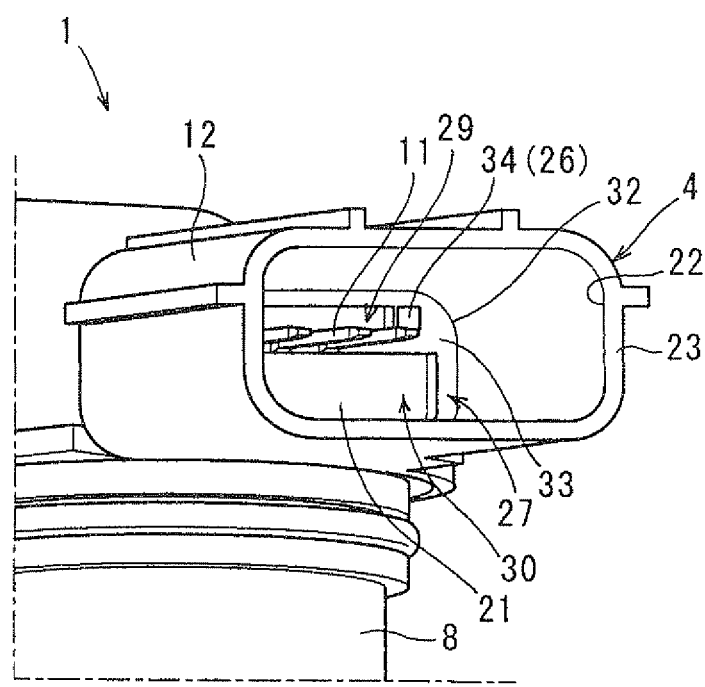
FIG. 3 is a perspective view illustrating the connector in accordance with the embodiment.
Figure 4A:
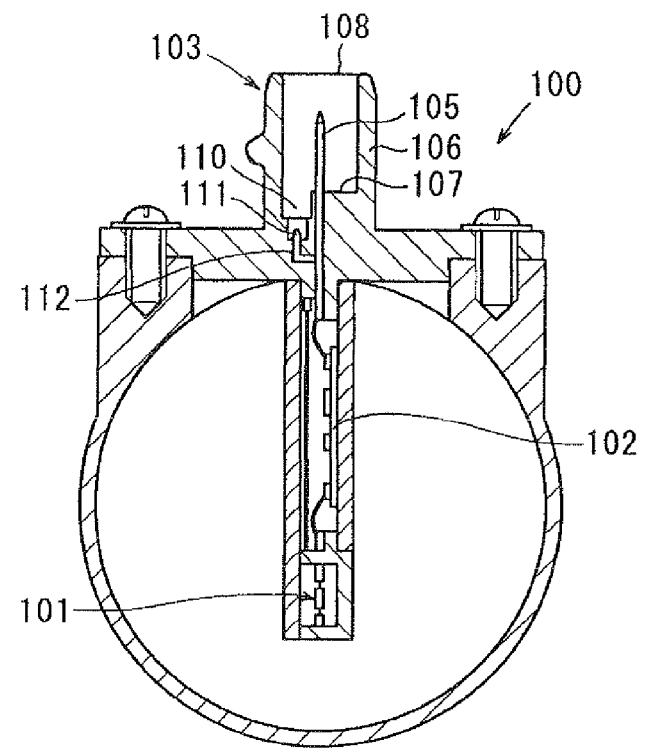
FIG. 4A is a sectional view illustrating a previously proposed flow measuring device.
Figure 4B:
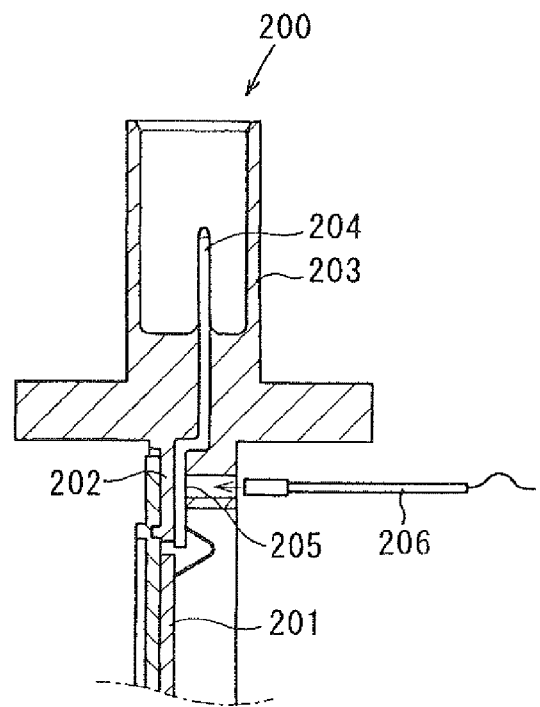
FIG. 4B is a sectional view illustrating the previously proposed flow measuring device.

The connector 4 is disposed above the housing 8 in FIGS. 1 and 3, and includes a terminal 11, and a connector housing 12 holding this terminal 11. The terminal 11 is made up of four terminals: a sensor power source terminal 13 for supplying electric power to the flow rate sensor 3; a thermistor power terminal 14 for supplying electric power to the thermistor; a GND terminal 15 that is connected to the flow rate sensor 3 and GND of the thermistor; and a output terminal 16 that outputs the signal from the electronic circuit.

Figure 2B:
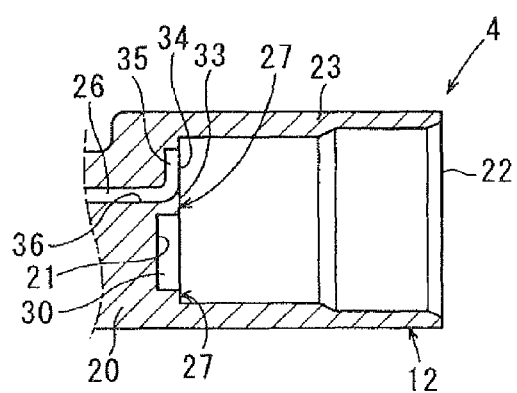
FIG. 2B is a sectional view taken along a line IIB-IIB in FIG. 2A.
Figure 2C:
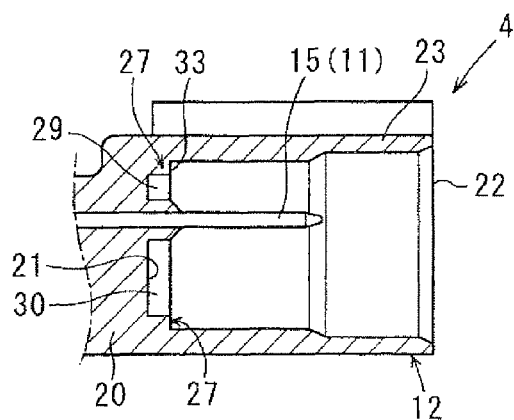
FIG. 2C is a sectional view taken along a line IIC-IIC in FIG. 2A.

The connector housing 12 is made of resin, and has a cylindrical shape having a bottom (see FIGS. 2B, 2C, and 3). More specifically, the connector housing 12 includes a bottom wall portion 20 having a bottom face 21, and a cylindrical portion 23 that extends cylindrically from the bottom wall portion 20 and has an opening 22. The terminals 11 are embedded in the bottom wall portion 20 of the connector housing 12 by insert molding. Inside the cylindrical portion 23 of the connector housing 12, a front end portion of the terminal 11 projects from the bottom face 21 toward the opening 22 (see FIG. 2C).

The sides of the sensor power source terminal 13, the GND terminal 15, and the output terminal 16 that are embedded in the connector housing 12 are electrically connected respectively to, for example, the control circuit, GND, and the output circuit of the electronic circuit, and they are thereby electrically connected to the electronic circuit. The thermistor power terminal 14 is connected to a plus terminal of the thermistor.

The four terminals 11 are aligned and extend. Provided that a direction of the alignment of the terminals 11 is a lateral direction, for example, the thermistor power terminal 14, the sensor power source terminal 13, the GND terminal 15, and the output terminal 16 are arranged in this order from one side in the lateral direction.

The connector housing 12 holds an adjusting terminal 26 for adjusting the electronic circuit, in addition to the terminal 11. The adjusting terminal 26 is electrically connected to the output circuit of the electronic circuit, and an electrical signal can be inputted from the outside into the output circuit through the adjusting terminal 26.

In the present embodiment, for example, the electrical signal is inputted into the output circuit from the outside by the adjusting terminal 26, and output adjustment is performed by adjusting an amplification factor (gain and offset) of an output signal. Specifically, the electrical signal (e.g., serial digital signal or analog signal) is inputted from the outside through the adjusting terminal 26. Data is written in a memory integrated in the electronic circuit, and based on this data, the amplification factor of the output signal is changed.

A counterpart connector (not shown) to be connected to the external device is fitted into the connector 4. Accordingly, the electronic circuit is electrically connected to the external device through the terminal 11. The adjusting terminal 26 is different from the terminal 11, which is electrically connected to the outside when the connector 4 is fitted to its counterpart connector, in that the adjusting terminal 26 is not constantly connected to the outside, but used only at the time of circuit adjustment.

Characteristics of the flow measuring device 1 of the embodiment will be described. The connector housing 12 of the flow measuring device 1 of the embodiment includes a step portion 27 (projection portion) that projects from the bottom face 21 of the connector housing 12 toward the opening 22 (see FIGS. 2A to 2C).

Provided that a region in which the bottom face 21 of the connector housing 12 is exposed (i.e., region where the step portion 27 does not exist) is a bottom face region, the bottom face regions are formed at two places to sandwich the alignment of the terminals 11 in the longitudinal direction when a direction perpendicular to the direction of the alignment of the terminals 11 is referred to as a longitudinal direction. More specifically, the bottom face regions include a first bottom face region 29 that is formed on one side of the alignment of the terminals 11 in the longitudinal direction, and a second bottom face region 30 that is formed on the other side of the alignment of the terminals 11 in the longitudinal direction (see FIG. 2A). Bottom parts other than the first bottom face region 29 and the second bottom face region 30 serve as the step portion 27 that projects toward the opening 22. A positional relationship between the first and second bottom face regions 29, 30, and the step portion 27 when the connector 4 is seen from its front will be described below (see FIG. 2A).

The first bottom face region 29 and the second bottom face region 30 both have a rectangular shape extending in the direction of the alignment of the terminals 11. The alignment of the terminals 11 is formed further on one side of the center in the longitudinal direction. The first bottom face region 29 has a smaller width in the longitudinal direction than the second bottom face region 30 (see FIG. 2A).

A region boundary 29a of the first bottom-face region 29 on its one side in the longitudinal direction is located slightly inward of a boundary 32 between the cylindrical portion 23 and the bottom wall portion 20 on one side in the longitudinal direction. A region boundary 30a of the second bottom face region 30 on the other side in the longitudinal direction is located slightly inward of the boundary 32 on the other side in the longitudinal direction (see FIG. 2A). A region boundary 29b of the first bottom face region 29 on the other side in the longitudinal direction, and a region boundary 30b of the second bottom face region 30 on one side in the longitudinal direction are located adjacent to the alignment of the terminals 11 to sandwich the alignment of the terminals 11 in the longitudinal direction.

A region boundary 29c of the first bottom face region 29 on one side in the lateral direction and a region boundary 30c of the second bottom face region 30 on one side in the lateral direction are located slightly inward of the boundary 32 on one side in the lateral direction. A region boundary 29d of the first bottom face region 29 on the other side in the lateral direction and a region boundary 30d of the second bottom face region 30 on the other side in the lateral direction are located inward of the boundary 32 on the other side in the lateral direction. A distance between the region boundary 29d and the boundary 32 on the other side in the lateral direction is longer than a distance between the region boundary 30d and the boundary 32 on the other side in the lateral direction (see FIG. 2A).

Accordingly, between the region boundary 29a and the boundary 32 on one side in the longitudinal direction; between the region boundary 30a and the boundary 32 on the other side in the longitudinal direction; between the region boundary 29b and the region boundary 30b; between the region boundary 29c and the boundary 32 on one side in the lateral direction; between the region boundary 30c and the boundary 32 on one side in the lateral direction; between the region boundary 29d and the boundary 32 on the other side in the lateral direction; and between the region boundary 30d and the boundary 32 on the other side in the lateral direction, the step portion 27 projecting toward the opening 22 is formed. A surface 33 of the step portion 27 on the opening 22-side is located on the opening 22-side of the bottom face 21 in an axial direction of the cylindrical portion 23. The step portion 27 is a contact surface with which the counterpart connector is brought into contact at the time of fitting between the connector 4 and its counterpart connector.

The adjusting terminal 26 is held by the connector housing 12 to include an exposed part 34 that is exposed from the surface 33 of the step portion 27 on the opening 22-side. In the present embodiment, the adjusting terminal 26 is held by the connector housing 12 such that its front end portion is exposed on the surface 33 of the step portion 27 on the opening 22-side between the region boundary 29d and the boundary 32 on the other side in the lateral direction (i.e., on the surface 33 of the first bottom face region 29 on the other side in the lateral direction).

The front end portion of the adjusting terminal 26 is bent into an L-shaped manner, and a surface of this bent piece 35 on the opening 22-side is the exposed part 34 which is exposed from the surface 33. The surface of the bent piece 35 on the opening 22-side is flush with the surface 33 (see FIG. 2B). As described above, the adjusting terminal 26 is connected to the electronic circuit on its side embedded in the connector housing 12. Accordingly, the electronic circuit can be adjusted by connecting a probe of a device for adjustment, for example, to the exposed part 34. In the present embodiment, the terminal 11 also projects from the surface 33 of the step portion 27 of the connector housing 12 on the opening 22-side toward the opening 22 (see FIG. 2A).

An operation and working-effect of the flow measuring device 1 of the embodiment will be described. In the flow measuring device 1 of the embodiment, the connector housing 12 includes the step portion 27 projecting from the bottom face 21 toward the opening 22. The exposed part 34 of the adjusting terminal 26 is exposed from the surface 33 of the step portion 27 on the opening 22-side.

Accordingly, even if water enters into the connector housing 12 to be accumulated on the bottom face 21 of the connector housing 12 at the time of fitting between the connector 4 and its counterpart connector, the adjusting terminal 26 is exposed on a surface that is one level higher on the opening 22-side than the bottom face 21 (surface 33 of the step portion 27 on the opening 22-side). Therefore, it is unlikely that the adjusting terminal 26 is in contact with the water. As a result, the water is prevented from entering into the electronic circuit through an interface 36 between the adjusting terminal 26 and the connector housing 12.

Particularly, when the flow measuring device 1 is disposed such that the opening 22-side of the connector housing 12 coincides with the upward direction and the bottom face 21-side of the housing 12 coincides with the downward direction, although water easily accumulates on the bottom face 21, the adjusting terminal 26 is exposed on the surface that is one level higher on the opening 22-side than the bottom face 21 despite the accumulation of water on the bottom face 21. Thus, the adjusting terminal 26 is not easily in contact with the water.

Moreover, the adjusting terminal 26 is disposed inside the cylindrical portion 23 of the connector housing 12. Consequently, the adjusting terminal 26 cannot be touched to the outside air at the time of fitting between the connector 4 and its counterpart connector. Thus, the exposed part 34 does not need to be sealed after adjustment.

In addition, in the flow measuring device 1, the exposed part 34 is disposed on the same level as the surface 33 of the step portion 27 on the opening 22-side. Accordingly, in the case of the surface 33 of the step portion 27 on the opening 22-side serving as a contact surface with the counterpart connector at the time of fitting between the connector 4 and its counterpart connector, the adjusting terminal 26 does not interfere with the counterpart connector.

The mode of the flow measuring device 1 is not limited to the above-described embodiment, and various modifications may be made to the mode of the measuring device 1. For example, in the embodiment, the flow rate sensor 3 is of a thin film type, but a sensor using a bobbin-type exothermic resistor and temperature-sensitive resistor may be employed for the flow rate sensor 3.

Furthermore, in the embodiment, the exposed part 34 of the adjusting terminal 26 is coplanar with the surface 33. Alternatively, the exposed part 34 may project further toward the opening 22 than the surface 33 in the axial direction of the cylindrical portion 23. In this case, it is necessary to set the position and size of the adjusting terminal 26 such that the adjusting terminal 26 does not interfere with the counterpart connector at the time of fitting between the connector 4 and its counterpart connector. Moreover, the exposed part 34 may be located further on the opposite side from the opening 22 than the surface 33. In this case, it is desirable that the position of the exposed part 34 in the axial direction of the cylindrical portion 23 should be located further on the opening 22-side than the bottom face 21.

In the embodiment, the exposed part 34 is located at the step portion 27 on the other side of the first bottom face region 29 in the lateral direction. However, the position of the exposed part 34 is not limited to the embodiment as long as the exposed part 34 is located on the surface 33 of the step portion 27 on the opening 22-side. In the embodiment, the step portion 27 is provided such that the bottom of the housing 12 except the first bottom face region 29 and the second bottom face region 30 is integrally continuously formed. However, the step portion 27 may be separately formed. The position of the step portion 27 and the number of step portions 27 are not limited to those described in the embodiment. In addition, in the embodiment, the surface 33 of the step portion 27 on the opening 22-side serves as the contact surface with the counterpart connector. Alternatively, a step portion that projects further on the opening 22-side than the step portion 27, at which the exposed part 34 is exposed, may be formed. A surface of this step portion on the opening 22-side may serve as the contact surface with the counterpart connector.

To sum up, the flow measuring device 1 of the above embodiment may be described as follows.

The flow measuring device 1 includes a flow rate sensor 3, an electronic circuit, a connector 4, and an adjusting terminal 26. The flow rate sensor 3 is configured to output a detection signal in accordance with a flow rate. The electronic circuit is electrically connected to the flow rate sensor 3 to control input into and output from the flow rate sensor 3. The connector 4 includes a connecting terminal 11 and a connector housing 12. The connecting terminal 11 electrically connects together the electronic circuit and an external device. The connector housing 12 is formed in a cylindrical shape having a bottom and an opening 22 to hold the connecting terminal 11. The connector housing 12 includes a projection portion 27 that projects from a bottom face 21 of the bottom toward the opening 22. The adjusting terminal 26 is electrically connected to the electronic circuit so as to adjust the electronic circuit. The adjusting terminal 26 is held by the connector housing 12 and includes an exposed part 34 exposed from the connector housing 12. The exposed part 34 is exposed from a surface 33 of the projection portion 27 on an opening 22-side.

Accordingly, even if water enters into the connector housing 12 to be accumulated on the bottom face 21 of the connector housing 12 while the connector 4 is fitted to its counterpart connector, the adjusting terminal 26 is exposed on a surface that is one level higher on the opening 22-side than the bottom face 21 (surface 33 of the projection portion 27 on the opening 22-side). Therefore, it is unlikely that the adjusting terminal 26 is in contact with the water. As a result, the water is prevented from entering into the electronic circuit through an interface 36 between the adjusting terminal 26 and the connector housing 12. Moreover, the adjusting terminal 26 is disposed inside the connector housing 12. Consequently, the adjusting terminal 26 cannot be touched to the outside air at the time of fitting between the connector 4 and its counterpart connector. Therefore, the adjusting terminal 26 does not need to be sealed after adjustment.

Additional advantages and modifications will readily occur to those skilled in the art. The invention in its broader terms is therefore not limited to the specific details, representative apparatus, and illustrative examples shown and described.

What is claimed is:

1. A flow measuring device comprising:
    a flow rate sensor that is configured to output a detection signal in accordance with a flow rate;
    an electronic circuit that is electrically connected to the flow rate sensor to control input into and output from the flow rate sensor;
    a connector that includes:
        a connecting terminal electrically connecting together the electronic circuit and an external device; and
        a connector housing formed in a cylindrical shape having a bottom and an opening to hold the connecting terminal, wherein the connector housing includes a projection portion that projects from a bottom face of the bottom toward the opening, a counterpart connector being brought into contact with the projection portion; and
    an adjusting terminal that is electrically connected to the electronic circuit so as to adjust the electronic circuit, wherein:
    the adjusting terminal is held by the connector housing and includes an exposed part exposed from the connector housing;
    the exposed part is exposed from a surface of the projection portion on an opening-side; and
    the exposed part is formed to be coplanar with the surface of the projection portion on the opening-side.

* * * * *